(12) United States Patent
Wong et al.

(10) Patent No.: US 11,624,314 B2
(45) Date of Patent: Apr. 11, 2023

(54) COMBUSTION CHAMBER VALVE AND FUEL SYSTEM FOR DRIVEN FASTENER HAND TOOL

(71) Applicant: Power Tech Staple and Nail, Inc., Monterey Park, CA (US)

(72) Inventors: Raymond Wong, Alhambra, CA (US); Shih-Yi Chen, Taoyuan (TW); Chin-Chuan Chen, Taoyuan (TW)

(73) Assignee: Power Tech Staple and Nail, Inc., Monterey Park, CA (US)

( * ) Notice: Subject to any disclaimer, the term of this patent is extended or adjusted under 35 U.S.C. 154(b) by 466 days.

(21) Appl. No.: 16/546,630

(22) Filed: Aug. 21, 2019

(65) Prior Publication Data

US 2020/0063643 A1   Feb. 27, 2020

Related U.S. Application Data

(60) Provisional application No. 62/720,732, filed on Aug. 21, 2018.

(51) Int. Cl.
| | | |
|---|---|---|
| *B25C 1/08* | (2006.01) | |
| *F02B 29/08* | (2006.01) | |
| *F15B 15/04* | (2006.01) | |
| *B25C 1/04* | (2006.01) | |
| *B25C 1/00* | (2006.01) | |
| *F02B 63/02* | (2006.01) | |

(52) U.S. Cl.
CPC ............ *F02B 29/086* (2013.01); *B25C 1/008* (2013.01); *B25C 1/046* (2013.01); *B25C 1/08* (2013.01); *F02B 63/02* (2013.01); *F15B 15/04* (2013.01); *F15B 2211/20523* (2013.01)

(58) Field of Classification Search
CPC . B25C 1/08; B25C 1/008; B25C 1/046; F02B 29/086; F02B 63/02; F15B 15/04; F15B 2211/20523
See application file for complete search history.

(56) References Cited

U.S. PATENT DOCUMENTS

| | | |
|---|---|---|
| 4,483,280 A | 11/1984 | Nikolich |
| 4,712,379 A | 12/1987 | Adams et al. |
| 4,717,060 A | 1/1988 | Cotta |
| 5,199,626 A | 4/1993 | Terayama et al. |
| 5,626,274 A | 5/1997 | Shkolnikov et al. |
| 5,680,980 A | 10/1997 | Robinson |
| 5,687,899 A | 11/1997 | Dohi et al. |
| 5,713,313 A | 2/1998 | Berry |
| 5,722,578 A | 3/1998 | Van Erden et al. |
| 5,794,831 A | 8/1998 | Velan et al. |

(Continued)

*Primary Examiner* — Gonzalo Laguarda
(74) *Attorney, Agent, or Firm* — Canady & Lortz LLP; Bradley K. Lortz (57) ABSTRACT

A novel combustion chamber valve and fuel system for driven fastener hand tool is disclosed having a fuel pump disposed parallel to the combustion and piston chambers. Pressure applied a safety at the nose of the tool is activates the fuel pump in a common direction. Pressure applied on a trigger activates the valve system prior to firing in a common direction. The valve system employs a central shaft coupling three valves, an inlet valve using a novel wedged circumferential edge seal, a control valve using a novel edge circumferential seal with a ventilated support, and a charging exhaust valve using a face seal.

13 Claims, 10 Drawing Sheets

(56) References Cited

U.S. PATENT DOCUMENTS

| | | |
|---|---|---|
| 5,799,855 A | 9/1998 | Veoukas et al. |
| 5,806,747 A | 9/1998 | Erden et al. |
| 5,860,580 A | 1/1999 | Velan et al. |
| 5,897,043 A | 4/1999 | Veoukas et al. |
| 5,909,836 A | 6/1999 | Shkolnikov et al. |
| 5,911,350 A | 6/1999 | Bolger et al. |
| 5,971,245 A | 10/1999 | Robinson |
| 5,975,397 A | 11/1999 | Van Erden et al. |
| 5,975,569 A | 11/1999 | Starozhitsky et al. |
| 6,012,622 A | 1/2000 | Weinger et al. |
| 6,102,270 A | 8/2000 | Robinson |
| 6,108,908 A | 8/2000 | Starozhitsky et al. |
| 6,109,165 A | 8/2000 | Velan et al. |
| 6,145,723 A | 11/2000 | Gupta |
| 6,145,724 A | 11/2000 | Shkolnikov et al. |
| 6,164,510 A | 12/2000 | Deiso et al. |
| 6,176,412 B1 | 1/2001 | Weinger et al. |
| 6,179,192 B1 | 1/2001 | Weinger |
| 6,260,519 B1 | 7/2001 | Phillips |
| 6,505,767 B2 | 1/2003 | Thieleke et al. |
| 6,520,397 B1 | 2/2003 | Moeller |
| 6,523,860 B1 | 2/2003 | Shkolnikov et al. |
| 6,584,945 B2 | 7/2003 | Porth |
| 6,619,527 B1 | 9/2003 | Moeller |
| 6,626,344 B2 | 9/2003 | Shkolnikov et al. |
| 6,671,163 B2 | 12/2003 | Shkolnikov et al. |
| 6,685,193 B2 | 2/2004 | Roberts et al. |
| 6,715,655 B1 | 4/2004 | Taylor et al. |
| 6,722,550 B1 | 4/2004 | Ricordi et al. |
| 6,755,159 B1 | 6/2004 | Adams et al. |
| 6,755,335 B2 | 6/2004 | Fielitz |
| 6,783,047 B2 | 8/2004 | Granacher |
| 6,796,476 B2 | 9/2004 | Birk et al. |
| 6,796,478 B2 | 9/2004 | Shkolnikov et al. |
| 6,840,033 B2 | 1/2005 | Adams |
| 6,843,401 B2 | 1/2005 | Favre-Bulle |
| 6,860,243 B2 | 3/2005 | Doherty et al. |
| 6,863,045 B2 | 3/2005 | Ricordi |
| 6,874,452 B2 | 4/2005 | Adams |
| 6,886,730 B2 | 5/2005 | Fujisawa et al. |
| 6,892,524 B1 | 5/2005 | Van Erden et al. |
| 6,938,810 B2 | 9/2005 | Robinson |
| 6,964,362 B2 | 11/2005 | Shkolnikov et al. |
| 6,966,478 B2 | 11/2005 | Adams et al. |
| 6,974,063 B2 | 12/2005 | Schiestl et al. |
| 7,040,520 B2 | 5/2006 | Turk |
| 7,040,521 B2 | 5/2006 | Kolodzej et al. |
| 7,066,117 B2 | 6/2006 | Nishikawa et al. |
| 7,107,944 B1 | 9/2006 | Heinzen |
| 7,118,018 B2 | 10/2006 | Turk |
| 7,124,923 B2 | 10/2006 | Panasik |
| 7,140,331 B1 | 11/2006 | Heinzen |
| 7,163,134 B2 | 1/2007 | Moeller et al. |
| 7,201,301 B2 | 4/2007 | Moeller et al. |
| 7,201,302 B2 | 4/2007 | Panasik et al. |
| 7,222,765 B2 | 5/2007 | Robinson |
| 7,275,505 B2 | 10/2007 | Moeller et al. |
| 7,290,691 B1 | 11/2007 | Wen |
| 7,296,719 B1 | 11/2007 | Taylor et al. |
| 7,299,963 B2 | 11/2007 | Moeller et al. |
| 7,314,025 B2 | 1/2008 | Shkolnikov et al. |
| 7,341,171 B2 | 3/2008 | Moeller et al. |
| 7,377,413 B2 | 5/2008 | Wen |
| 7,383,974 B2 | 6/2008 | Moeller et al. |
| 7,392,922 B2 | 7/2008 | Vanstaan et al. |
| 7,431,185 B2 | 10/2008 | Moeller et al. |
| 7,478,740 B2 | 1/2009 | Shea et al. |
| 7,487,898 B2 | 2/2009 | Moeller et al. |
| 7,497,271 B2 | 3/2009 | Moeller et al. |
| 7,510,105 B2 | 3/2009 | Moeller et al. |
| 7,568,602 B2 | 8/2009 | Turk |
| 7,584,723 B2 | 9/2009 | Shkolnikov et al. |
| 7,587,897 B2 | 9/2009 | Strong |
| 7,588,096 B2 | 9/2009 | Panasik |
| 7,591,236 B2 | 9/2009 | Moeller et al. |
| 7,591,249 B2 | 9/2009 | Wagdy et al. |
| 7,603,854 B2 | 10/2009 | Strong |
| 7,617,957 B2 | 11/2009 | Holderfield et al. |
| 7,634,979 B2 | 12/2009 | Adams |
| 7,654,429 B2 | 2/2010 | Shea et al. |
| 7,661,568 B2 | 2/2010 | Vanstaan et al. |
| 7,673,779 B2 | 3/2010 | Moeller et al. |
| 7,757,920 B2 | 7/2010 | Shea et al. |
| 7,770,772 B2 | 8/2010 | Adams |
| 7,784,560 B2 | 8/2010 | Mina et al. |
| 7,802,500 B2 | 9/2010 | Kolodziej et al. |
| 7,841,501 B2 | 11/2010 | Panasik et al. |
| 7,866,519 B2 | 1/2011 | Cortez, Jr. |
| 7,918,375 B2 | 4/2011 | Johnson et al. |
| 7,926,733 B2 | 4/2011 | Micheli |
| 7,938,104 B2 | 5/2011 | Adams |
| 7,946,463 B2 | 5/2011 | Moeller |
| 8,002,160 B2 | 8/2011 | Larkin et al. |
| 8,016,046 B2 | 9/2011 | Zhao et al. |
| 8,042,718 B2 | 10/2011 | Taylor et al. |
| 8,070,031 B2 | 12/2011 | Moeller et al. |
| 8,087,394 B2 | 1/2012 | Adams |
| 8,113,403 B2 | 2/2012 | Tanaka et al. |
| 8,152,038 B2 | 4/2012 | Rouger et al. |
| 8,191,751 B2 | 6/2012 | Moeller et al. |
| 8,205,582 B2 | 6/2012 | Adams |
| 8,220,686 B2 | 7/2012 | Kestner et al. |
| 8,261,847 B2 | 9/2012 | Ford et al. |
| 8,267,298 B2 | 9/2012 | Zahner et al. |
| 8,276,798 B2 | 10/2012 | Moeller et al. |
| 8,302,831 B2 | 11/2012 | Taylor et al. |
| 8,302,832 B2 | 11/2012 | Porth et al. |
| 8,313,545 B2 | 11/2012 | Panasik et al. |
| 8,336,749 B2 | 12/2012 | Largo |
| 8,347,832 B2 | 1/2013 | Adams |
| 8,348,118 B2 | 1/2013 | Segura |
| 8,376,204 B2 | 2/2013 | Buetow et al. |
| 8,511,264 B2 | 8/2013 | Adams |
| 8,523,037 B2 | 9/2013 | Segura |
| D691,012 S | 10/2013 | Buetow et al. |
| 8,579,175 B2 | 11/2013 | Mina |
| 8,925,517 B2 * | 1/2015 | Adams ............. B25C 1/08 123/258 |
| 9,950,414 B2 | 4/2018 | Wong et al. |
| 10,759,032 B2 * | 9/2020 | Schmidt ............. B25C 1/08 |
| 2004/0182337 A1 | 9/2004 | Schiestl et al. |
| 2005/0035171 A1 | 2/2005 | Ohtsu et al. |
| 2006/0065219 A1 | 3/2006 | Hertlein et al. |
| 2008/0217372 A1 * | 9/2008 | Webb ............. B25C 1/08 227/10 |
| 2012/0210974 A1 | 8/2012 | Adams |
| 2015/0369118 A1 | 12/2015 | Adams |
| 2016/0354908 A1 * | 12/2016 | Wong ............. B25C 1/08 |

* cited by examiner

Section A-A
FIG. 1A

FIG. 1B

Section A-A
FIG. 1C

Section A-A
FIG. 2A

Section B-B
FIG. 2B

COMBUSTION CHAMBER VALVE AND FUEL SYSTEM FOR DRIVEN FASTENER HAND TOOL

CROSS-REFERENCE TO RELATED APPLICATIONS

This application claims the benefit under 35 U.S.C. § 119(e) of the following U.S. provisional patent application, which is incorporated by reference herein:

U.S. Provisional Patent Application No. 62/720,732, filed Aug. 21, 2018, and entitled "COMBUSTION CHAMBER VALVE AND FUEL SYSTEM FOR DRIVEN FASTENER HAND TOOL," by Wong et al.

BACKGROUND OF THE INVENTION

1. Field of the Invention

This invention relates to driven fastener hand tools. Particularly, this invention relates to combustion chamber valve and fuel systems for driven fastener hand tools.

2. Description of the Related Art

Powered fastener driving tools, e.g. nail guns, have existed for decades. Perhaps not coincidentally, the first commercial nail gun was introduced in 1950 after World War II wherein the technology for rapidly firing projectiles was greatly advanced. The first nail guns were pneumatic, driven by compressed air. Although pneumatic power is still the most prevalent, over time fastener driving tools have been developed using other means of power, such as electric motors, solenoids, combustibles, e.g. gas or explosive powder, have also been developed. Some development of technology related to powered fastener drivers, and particularly combustion driven fastener tools has occurred. However, there is still much need for further development.

Combustion driven fastener hand tools employing combustibles, e.g. gas or powder, to force a piston driver against a fastener introduce a unique set of parameters which must be properly balanced in order to achieve a working device. Sizing of the combustion chamber and valving are critical, in addition to the fuel delivery and mixing components. Moreover, greater optimization of a given design to improve power and efficiency can be greatly affected through precise understanding of the combustion process. For example, it has been determined that using a combustion chamber divided into portions having a control plate therebetween can greatly improve the efficiency and power of a combustion driven fastener device. In addition, it has also been previously observed that accurate location of the starting position of the driving piston can be important in the operation of a combustion driven device, particularly if the piston is heavy and likely to move under its own weight.

U.S. Pat. No. 8,925,517, issued Jan. 6, 2015, by Adams, discloses a gas-powered tool motor includes a combustion chamber with an intake valve at one end, an exhaust valve at another end, and a control plate or control valve between two portions of the combustion chamber. A piston or other positive displacement device is in communication with the combustion chamber. The intake and exhaust valves have closure members that are movable along a common axis in tandem between collective open positions for recharging the combustion chamber with the fuel and air mixture and collective closed positions for detonating the fuel and air mixture in the combustion chamber and displacing the positive displacement device. The control plate or control valve supports limited air flows from a first portion of the combustion chamber to a second portion of the combustion chamber even in the closed position of the control valve for supporting two-stage combustion.

Adams teaches use of a control valve between two portions of a combustion chamber having a closure member affixed to a central shaft (which moves axially to open and close the valve) and a control seat and forming a gap therebetween in the closed position. Upon combustion (with the control valve close) in the first portion of the combustion chamber, the flame front moves towards the gap, preferably driving a fuel/air mixture through the gap and compressing the combined fuel/air mixture in the second portion of the combustion chamber just prior to ignition in the second portion of the combustion chamber yielding more power to the fastener driver than would otherwise be elicited from an undivided combustion chamber burning the same amount of fuel.

Alternately, Adams teaches a control valve comprising a spring-loaded poppet having a closure member which moves along a central shaft and has a chamfered edge biased against a mating control valve seat affixed to the combustion chamber wall. The flame front moving through the first combustion chamber portion overcomes the spring bias and opens the valve, preferably driving a fuel/air mixture through the gap and compressing the combined fuel/air mixture in the second portion of the combustion chamber just prior to ignition in the second portion of the combustion chamber. Combustion in the second portion of the chamber then closes the valve.

Adams also discloses use of an alternate control plate affixed to a central shaft (which moves axially to open and close the valve) which forms an annular gap between the plate and the cylinder wall which functions similar to the gap between the closure member and the control seat of the control valve described above. Limited size openings may additionally be made through the control plate to support limited flow through the control plate. In a similar manner, the control plate can alternately be affixed to the cylinder wall allowing a central shaft to move freely through a central orifice of the control plate. In this case, limited flow through the control plate is formed solely by limited size openings through the plate.

The various control valve and control plate embodiments taught by Adams either yield equivalent flow in both directions with the valve in the closed position, i.e. between the closure member and seat or the control plates, or require additional moving parts and complexity, i.e. the poppet valve having a spring and control plate moving on the tie rod, which could limit life of the device being subject to combustion gases. A closed control plate, even one with orifices, as taught by Adams serves to block combustion pressure between the two portions of the combustion chamber.

U.S. Pat. No. 9,950,414, issued Apr. 24, 2018, by Wong et al., which is incorporated by reference herein, discloses a combustion driven fastener hand tool having an extruded front body component including two to three parallel bores. A first bore forms a cylinder for the piston which drives the fastener. A second bore forms a primary combustion chamber in which a fuel and air mixture is ignited and directed into the adjacent piston cylinder. A third bore (or alternately an attached component) forms a pathway for the fuel and air mixture to be directed into the primary combustion chamber.

U.S. Patent Application Publication No. 2016/0354908, published Jul. 26, 2018, by Wong et al., which is incorporated by reference herein, discloses a valve support for use with a valve in a combustion driven fastener hand tool, the valve being formed by a flexible disc affixed to a central shaft having a circumferential edge resting against an annular valve seat affixed to a wall of a combustion chamber with the valve in a closed position is disclosed. The valve support comprises a plate affixed to the central shaft and against the flexible disc, the plate having one or more ports therethrough. In a closed position, the flexible disc has a circumferential edge resting against an annular valve seat affixed to a wall of a combustion chamber but also a central portion of the flexible disc is proximate or contacting a central portion of the support plate on the same side of the disc as the annular valve seat. Various port configuration are possible.

The valve and fuel systems disclosed in U.S. Pat. No. 9,950,414 and U.S. Patent Application Publication No. 2016/0354908 operate, like many driven fastener hand tools, employing two separate motions by the user to activate the device and drive a fastener, first a safety located at the nose end of the tool must be pressed against the workpiece and second a trigger can then be pulled to fire the tool. In the specific example of the described combustion driven fastener hand tool, the motion of the safety causes fuel to be metered into an both portions of a divided combustion chamber. The vertical upward movement (if the tool is considered driving a fastener downward into a flat surface) on the safety is translated to cause the fuel pump to be activated. In this case, the fuel pump is disposed horizontally within the handle and must be actuated in a horizontal direction. Accordingly, the vertical upward motion of the safety is translated by a linkage to horizontal motion at the fuel pump.

Following this, pressure on the trigger causes the valve system to close. The valve system operated by the trigger comprises a central shaft coupling three valves, an inlet valve, a control valve, and a charging exhaust valve. The inlet and charging exhaust valves have o-ring seals. The control valve employs a face seal which can only be closed from motion towards the sealing surface. Motion of the trigger causes the central shaft to move downward, i.e. toward the nose of the tool. The face seal of the control valve moves downward to seal against an edge separating the two portions of the combustion chamber. Since the trigger is pulled in an upward direction, this motion must be converted, e.g. by a levering action, to cause the downward motion of the valve system.

In view of the foregoing, there is a need in the art for control valve and fuel system apparatuses and methods for operation of combustion driven fastener hand tools. There is a need for such devices to improve efficiency and delivered driving power. There is also a need for such apparatuses and methods that operate reliably and efficiently over many uses and at a reduced cost. There is further a need for such devices to function in a compact form and employ more efficient mechanisms. These and other needs are met by the present invention as detailed hereafter.

SUMMARY OF THE INVENTION

A novel combustion chamber valve and fuel system for driven fastener hand tool is disclosed having a fuel pump disposed parallel to the combustion and piston chambers. Pressure applied a safety at the nose of the tool is activates the fuel pump in a common direction. Pressure applied on a trigger activates the valve system prior to firing in a common direction. The valve system employs a central shaft coupling three valves, an inlet valve using a novel wedged circumferential edge seal, a control valve using a novel edge circumferential seal with a ventilated support, and a charging exhaust valve using a face seal.

A typical embodiment of the invention comprises a valve and fuel system for a combustion driven fastener hand tool, including a combustion chamber, a central shaft having an inlet valve for an inlet from a fuel pump, a control valve for a separating two portions of the combustion chamber, and a charging exhaust valve for allowing excess fuel and air to exhaust during charging disposed within the combustion chamber, the inlet valve, the control valve, and the charging exhaust valve are disposed in a closed position and an open position together by movement of the central shaft substantially away from a delivery point of the tool, and a trigger activated by motion away from the delivery point of the tool and thereby causing the movement of the central shaft and subsequent firing the combustion chamber.

In some embodiments, the the control valve can comprise an edge circumferential seal with a ventilated support in the closed position, the inlet valve can comprise a wedged circumferential edge seal in the closed position, and the the charging exhaust valve can comprise a face seal in the closed position.

In further embodiments, the charging of the combustion chamber can be activated by a safety proximate the delivery point pressed against a workpiece surface such that movement of the safety away from the delivery point activates a fuel pump by movement substantially away from the delivery point to cause fuel and air to be delivered through the inlet valve. The fuel pump can be disposed parallel to the combustion chamber.

In further embodiments, the combustion chamber can comprise a pair of parallel cylindrical sections with one of the pair of cylindrical sections having a piston and driver disposed therein for driving a fastener at the delivery point proximate a first end of the cylindrical section, another of the pair of parallel cylindrical sections having the central shaft, inlet valve, control valve and charging exhaust valve disposed therein, and the pair of parallel cylindrical sections are coupled proximate a second end distal the delivery point. The charging of the combustion chamber can be activated by a safety proximate the delivery point pressed against a workpiece surface such that movement of the safety away from the delivery point activates a fuel pump by movement substantially away from the delivery point to cause fuel and air to be delivered through the inlet valve. In this case, the fuel pump can be disposed parallel to the pair of parallel cylindrical sections of the combustion chamber.

Another embodiment of the invention comprises a combustion chamber comprising a pair of parallel cylindrical sections with one of the pair of cylindrical sections having a piston and driver disposed therein for driving a fastener at the delivery point proximate a first end of the cylindrical section and the pair of parallel cylindrical sections are coupled proximate a second end distal the delivery point and a fuel pump disposed parallel to the parallel cylindrical sections of the combustion chamber. Charging of the combustion chamber is activated by a safety proximate the delivery point pressed against a workpiece surface such that movement of the safety away from the delivery point activates a fuel pump by movement substantially away from the delivery point to cause fuel and air to be delivered through the inlet valve.

This embodiment can also include a central shaft having an inlet valve for an inlet from a fuel pump, a control valve for a separating two portions of the combustion chamber, and a charging exhaust valve for allowing excess fuel and air to exhaust during charging disposed within the combustion chamber, the inlet valve, the control valve, and the charging exhaust valve are disposed in a closed position and an open position together by movement of the central shaft substantially away from a delivery point of the tool. The central shaft, inlet valve, control valve and charging exhaust valve are all disposed within an other of the pair of cylindrical sections of the combustion chamber. This embodiment can be further modified consistent with the features and additions for the first embodiment described above.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

A novel combustion chamber valve and fuel system for driven fastener hand tool is disclosed having a fuel pump disposed parallel to the combustion and piston chambers. Pressure applied a safety at the nose of the tool is activates the fuel pump in a common direction. Pressure applied on a trigger activates the valve system prior to firing in a common direction, i.e. both the trigger and the valve system operate by movement in the same direction. The valve system employs a central shaft coupling three valves, an inlet valve using a novel wedged circumferential edge seal, a control valve using a novel edge circumferential seal with a ventilated support, and a charging exhaust valve using a face seal.

A combustion driven fastener hand tool employing the valve and fuel system described herein can be implemented also employing the other features and functions of most known combustion driven fastener hand tools. For example, the features of U.S. Pat. No. 9,950,414 and U.S. Patent Application Publication No. 2016/0354908, which are both incorporated herein, can be readily employed, provided they are not inconsistent with the requirements of the valve and fuel system described here as will be understood by those skilled in the art.

As previously mentioned, many driven fastener hand tools (e.g. U.S. Pat. No. 9,950,414 and U.S. Patent Application Publication No. 2016/0354908), the valve and fuel systems employ two distinct movements by the user to activate the device and drive a fastener, first a safety located at the nose end of the tool must be pressed against the workpiece and second a trigger can then be pulled to fire the tool. In the specific example of the described combustion driven fastener hand tool, the motion of the safety causes fuel to be metered into an both portions of a divided combustion chamber. The vertical upward movement (if the tool is considered driving a fastener downward into a flat surface) on the safety is translated to cause the fuel pump to be activated. In this case, the fuel pump is disposed horizontally within the handle and must be actuated in a horizontal direction. Accordingly, the vertical upward motion of the safety is translated by a linkage to horizontal motion at the fuel pump.

Following this, pressure on the trigger causes the valve system to close. The valve system operated by the trigger comprises a central shaft coupling three valves, an inlet valve, a control valve, and a charging exhaust valve. The inlet and charging exhaust valves have o-ring seals. The control valve employs a face seal which can only be closed from motion towards the sealing surface. Motion of the trigger (upward) must therefore cause the central shaft to move downward, i.e. toward the nose of the tool. The face seal of the control valve moves downward to seal against an edge separating the two portions of the combustion chamber. Since the trigger is pulled in an upward direction, this motion must be converted, e.g. by a levering action, to cause the downward motion of the valve system.

As described hereafter, embodiments of the present invention employ more efficient mechanism to operate both these required actions within a combustion driven fastener hand tool. Efficient operation of the fuel pump 128 is achieved by relocating it to be disposed in a bore parallel to bores (cylindrical sections 110, 126) of the combustion chamber 108 and the driver 130. Thus, operation of the fuel pump 128 (actuated by movement applied between its spring loaded ends) is now in line, i.e. parallel, to the movement of the movement of the safety 120 at the delivery point of the tool as it is pressed against the workpiece. In addition, operation of the trigger to fire the now fueled combustion driven tool is also used more efficiently because the upward pulling motion of the trigger is directly coupled to the valve system such that the same upward motion closes the combustion chamber prior to ignition of the fuel and air at the end of travel of the trigger. Details of the valve operation are described hereafter. In contrast, prior art combustion driven fastener tools employ valve motion opposite the direction of the trigger motion.

2. Exemplary Combustion Chamber Valve System

Figure 1A:
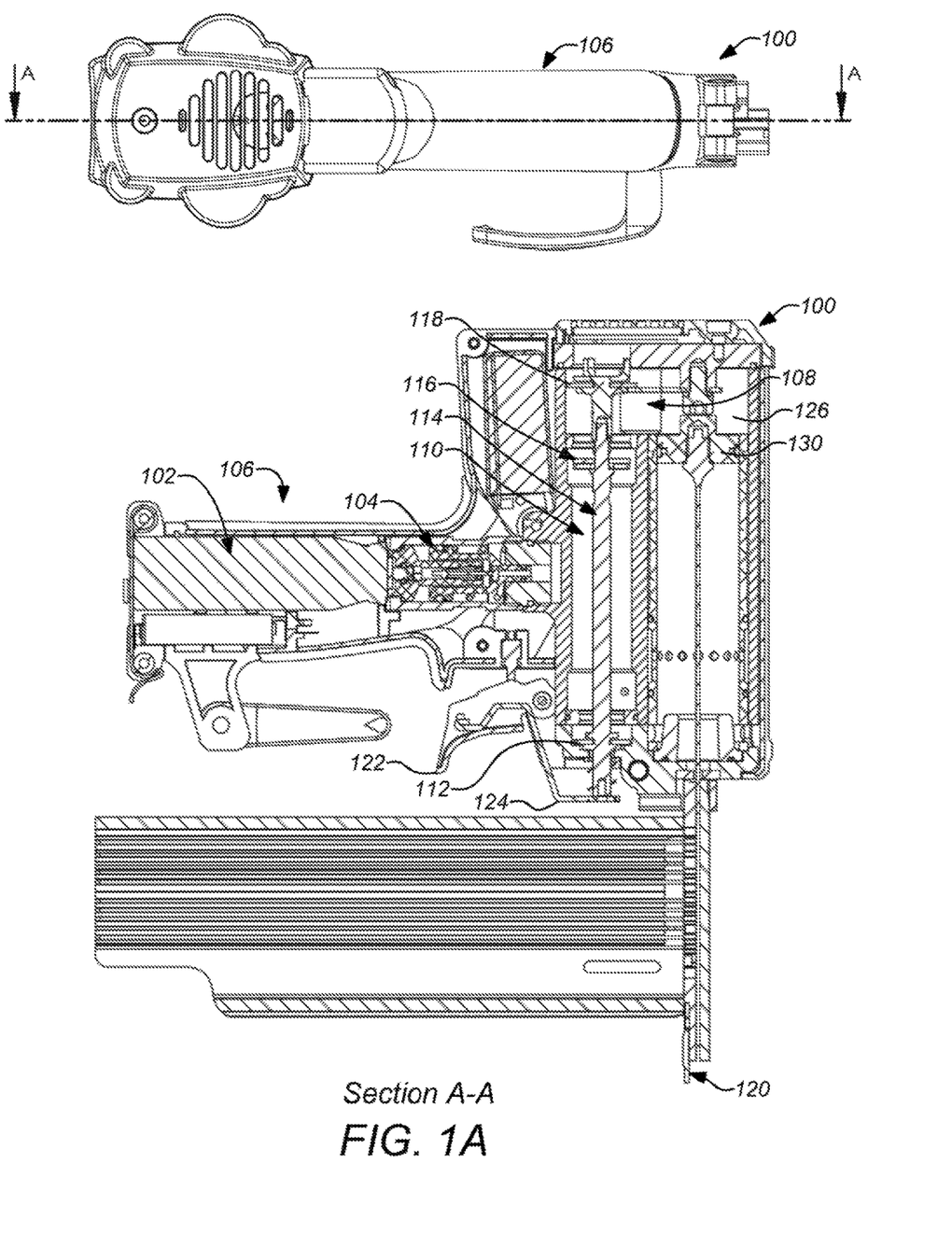
FIG. 1A shows an example embodiment of the invention having a combustion valve system in the open position.
Figure 1B:
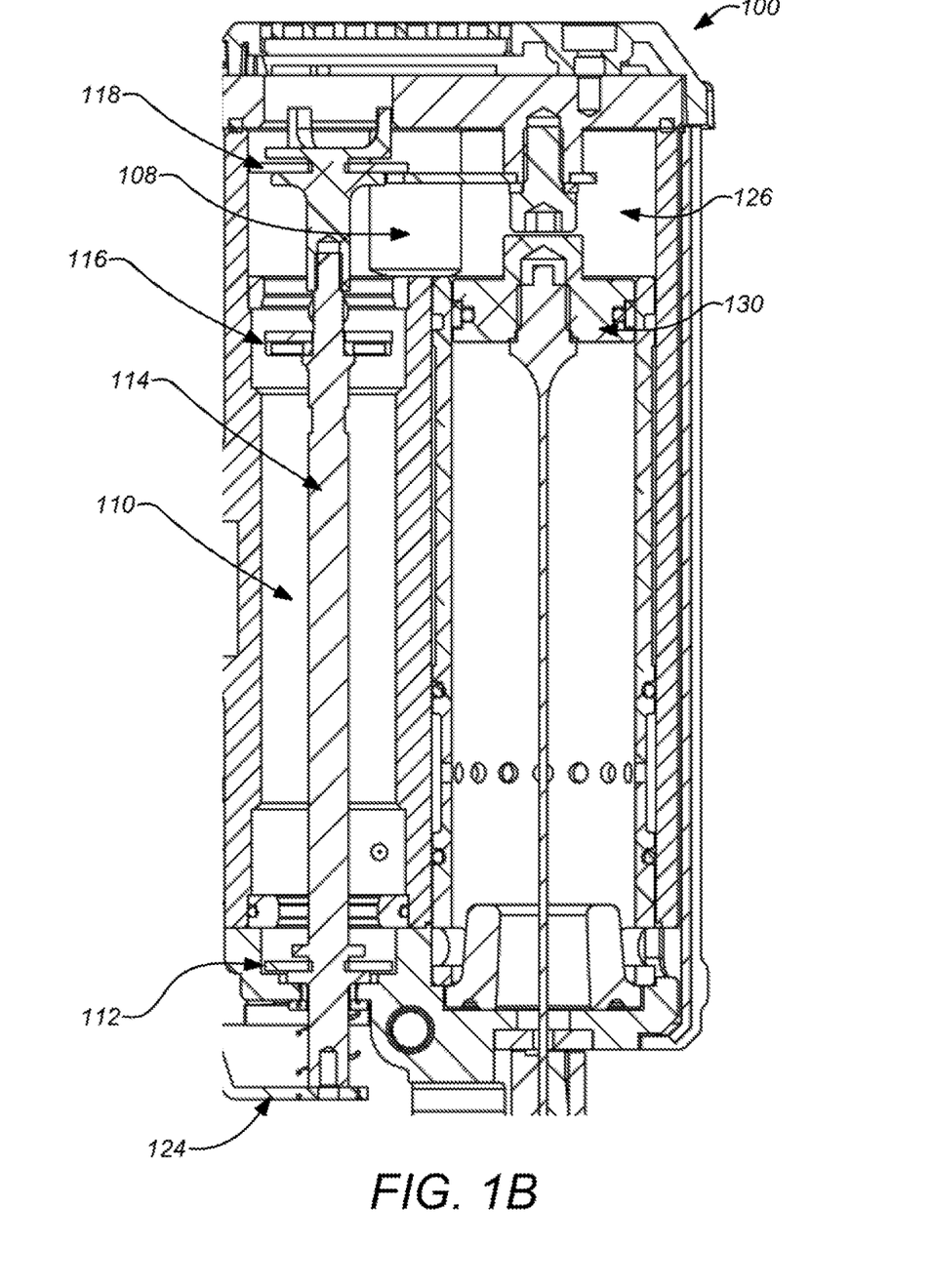
FIG. 1B shows an enlargement of the combustion valve system shown in FIG. 1A.

FIG. 1A shows an example embodiment of the invention having a combustion valve system in the open position. FIG. 1B shows an enlargement of the combustion valve system shown in FIG. 1A. This is the valve state before and after activation of the safety 120. The hand tool 100 employs a pressurized fuel canister 102 disposed in the handle 106 which is coupled in line to a pressure regulator, also disposed in the handle 106. A passageway couples the output fuel from the pressure regulator to a fuel pump (shown in the following section) which in turn delivers the metered fuel and air into the combustion chamber 108 near the bottom of the first portion 110 of the combustion chamber 108 where it passes through the open inlet valve 112. A central shaft 114 couples together the inlet valve 112, the control valve 116, and the charging exhaust valve 118 so that they are opened and closed in unison. In the open position during charging, the fuel and air flows throughout the combustion chamber and any excess air and/or air/fuel is released through the open charging exhaust valve 118 to atmosphere pushed out by the incoming air and fuel.

Charging is activated with the valves 112, 116, 118 in the open position by upward movement of the safety 120 at the delivery point of the tool 100, i.e. movement away from the delivery point. As will be shown in the following section, the fuel pump is activated by movement in the same general direction, movement substantially away from the delivery point. This common motion direct enables an efficient activation motion which also minimizes the likelihood of jamming as there is no complicated linkage which can be bent.

The combustion chamber 108 comprises a pair of parallel cylindrical sections 110, 126 with one of the pair of cylindrical sections having a piston and driver 130 disposed therein for driving a fastener at the delivery point proximate a first end of the cylindrical section 126 and the pair of parallel cylindrical sections 110, 126 are coupled proximate a second end distal the delivery point.

Suitable materials for the valves 112, 116, 118 must survive the temperatures and combustion without deteriorating and must also have the requisite flexibility for the application. Elastomeric materials such as silicone, fluorocarbon, fluorosilicone, buna, ethylene-propylene, neoprene, chloroprene, and other suitable rubber and polymer materials can be used.

Figure 1C:
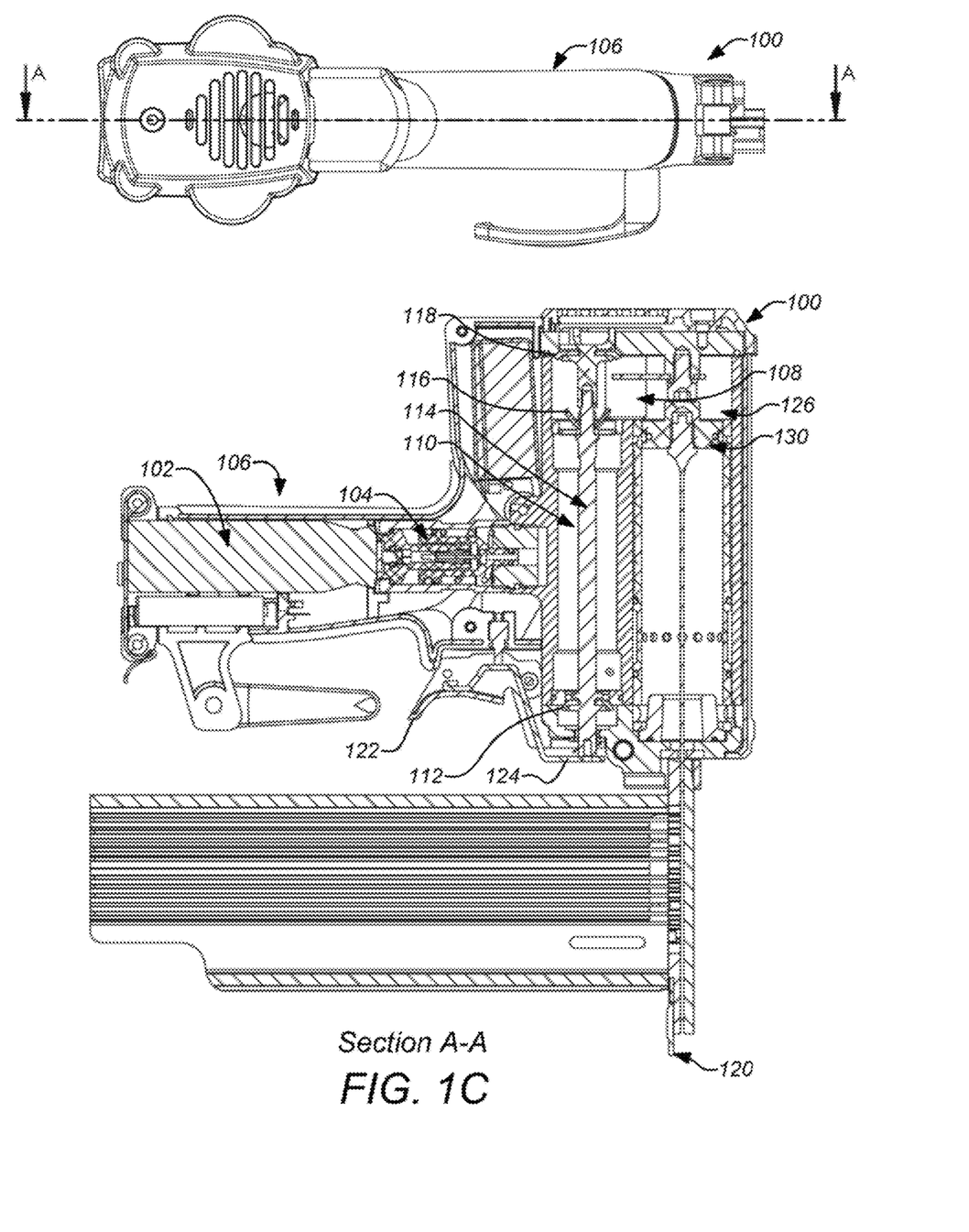
FIG. 1C shows an example embodiment of the invention having a combustion valve system in the closed position during ignition after activation of the safety and full drawing of the trigger.

FIG. 1C shows an example embodiment of the invention having a combustion valve system in the closed position during ignition after activation of the safety and full drawing of the trigger. The common central shaft 114 is shown moved fully upward, away from the delivery point. Movement of the common central shaft 114 is caused by upward movement of the trigger 122 (away from the delivery point) by the user which causes the link 124 to move in the same direction. The link 124 is in contact with the bottom end of the central shaft 114 and therefore causes it to move also in the same direction. The central shaft 114 is spring loaded to return to an open position after pressure on the trigger is released. Movement of the trigger 122 to the end of travel triggers ignition of the fuel and air only after the valves 112, 116, 118 have reached a fully closed position. As shown, at this time ignition in the first portion 110 of the combustion chamber 108 causes a pressure wave to travel upward and past the control valve 116 which is shown momentarily deflected in a concave shape. Accordingly, the control valve 116 can be considered a one way valve in the closed position. Ignition can be triggered by an electrical discharge within the first portion 110 proximate the inlet valve 112 of the combustion chamber 108 through any means known in the art. After ignition is transferred to the second portion 126 of the combustion chamber 108 the control valve will reclose against greater combustion pressure developing in the second portion 126.

Figure 1D:
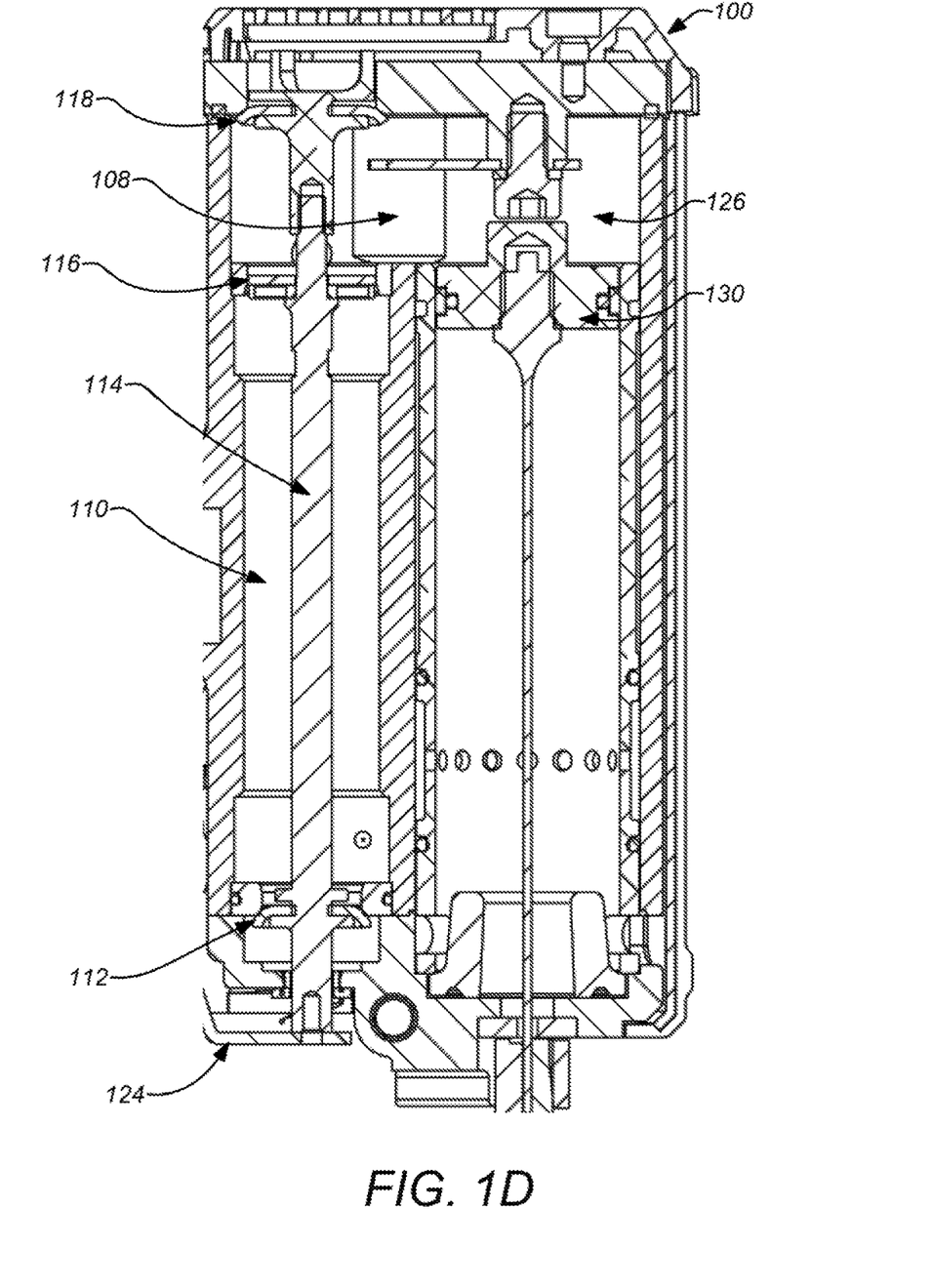
FIG. 1D shows an enlargement of the combustion valve system shown in FIG. 1C but in a pre-ignition state after activation of the safety but before full drawing of the trigger.

FIG. 1D shows an enlargement of the combustion valve system shown in FIG. 1C but in a pre-ignition state after activation of the safety but before drawing of the trigger 122 to the end of travel causing ignition. As mentioned above, this may also be considered the view after ignition has been transferred to the second portion 126 of the combustion chamber 108 and the control valve 116 is closed against greater combustion pressure developing in the second portion 126. The structure of the different valves 112, 116, 118 is significant as shown in FIG. 1D.

As shown in FIG. 1D in the closed position, the inlet valve 112 comprises a wedged circumferential edge seal. The inlet valve 112 comprises an elastomeric disc mounted through a central hole on the central shaft 114. The disc is held between two radial flanges on the shaft 114. The first portion 110 combustion chamber 108 includes a sealed ring having a reduced inner diameter with a chamfer which is matched to the outer diameter of the lower flange for the inlet valve 112 on the shaft 114 such that when the shaft is in the closed position the elastomeric disc becomes wedged into the chamfered circumferential gap between the inner diameter which is matched to the outer diameter of the lower flange. The wedged circumferential edge seal withstands the excessive combustion pressure during ignition and also allows the valve to opened by movement in a direction away from the combustion chamber (towards the delivery point).

As shown in FIG. 1D in the closed position, the control valve 116 comprises an edge circumferential seal with a ventilated support. The various structures and operation of the ventilated support using a face seal are described in U.S. Patent Application Publication No. 2016/0354908, which is incorporated herein. Although an edge seal is used in the control valve of the present application, the structure and characteristics of the support described in U.S. Patent Application Publication No. 2016/0354908 can be applied in embodiments of the invention. The edge seal of the present application is distinct because it allows the control valve to be closed by upward movement of the shaft 114 away from the delivery point. The control valve 116 also comprises an elastomeric disc mounted through a central hole on the central shaft 114. In this case, the first portion 110 combustion chamber 108 includes a reduced diameter ring having a diameter to match the outside diameter of the elastomeric disc such that a sliding fit occurs between the disc and the ring. A ventilated support is disposed on the shaft contacting the disc from below. The support is rigid, e.g. metal, and includes passages which allow combustion gases to flow more easily from the first portion 110 to the second portion 126 of the combustion chamber 108 but support the valve 116 closed against back pressure moving in the opposite direction.

As shown in FIG. 1D in the closed position, the charging exhaust valve 118 comprises a face seal but which can also include characteristics of the wedged circumferential edge seal of the inlet valve 112. Here also, the charging exhaust valve 118 comprises an elastomeric disc mounted through a central hole on the central shaft 114. The disc is held between two radial flanges on the shaft 114. The second portion 126 of the combustion chamber 108 (the housing) includes a chamfered diameter which is matched to the outer diameter of the lower flange for the charging exhaust valve 118 on the shaft 114 such that when the shaft is in the closed position the elastomeric disc becomes wedged into the chamfered circumferential gap between the inner diameter which is matched to the outer diameter of the lower flange. The wedged circumferential edge seal withstands the excessive combustion pressure as it moves into the second portion 126 of the combustion chamber 108. It should be noted that, because the closing direction relative to the combustion chamber 108 is opposite that of the inlet valve 112, it is much easier to develop a seal with the charging exhaust valve 118. Accordingly, less wedging of the disc is required and even conventional face seal can alternately be employed with the charging exhaust valve 118 as will be appreciated by those skilled in the art.

Figure 1E:
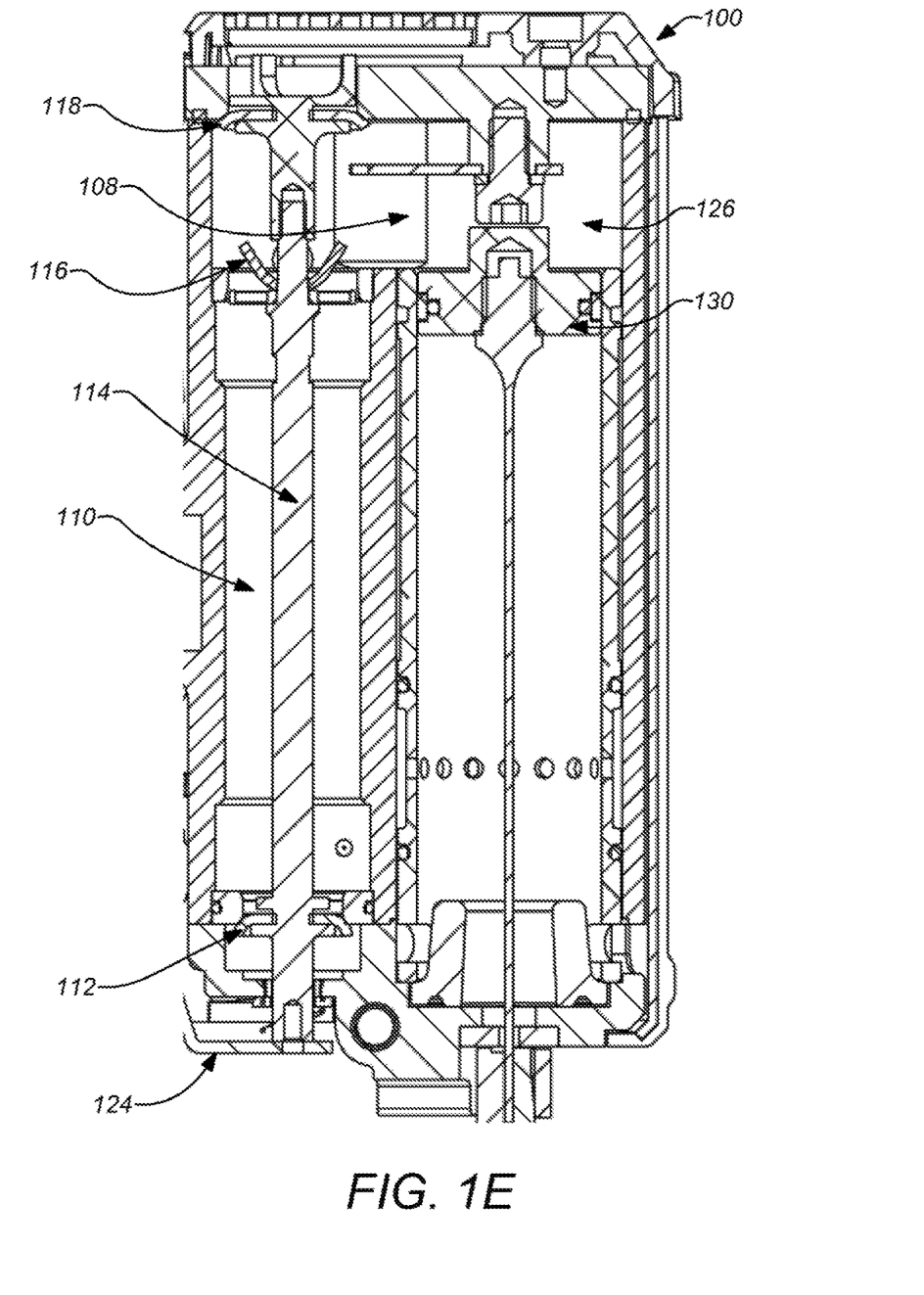
FIG. 1E shows an enlargement of the combustion valve system shown in FIG. 1C during ignition after activation of the safety and full drawing of the trigger.

FIG. 1E shows an enlargement of the combustion valve system shown in FIG. 1C during ignition after activation of the safety and full drawing of the trigger 122. At this time ignition in the first portion 110 of the combustion chamber 108 causes a pressure wave to travel upward and past the control valve 116 which is shown momentarily deflected in a concave shape.

It should also be noted that the use of wedged circumferential edge seal for the inlet valve 112 and the face seal or wedged circumferential edge seal for the charging exhaust valve 118 instead of o-ring seals, typically employed in the prior art, affords maintenance free operation of embodiments of the invention. Prior systems, employing o-rings at these and other locations require regular lubrication to continue trouble free operation. In contrast, face or wedged circumferential edge seals do not require any regular lubrication.

3. Exemplary Fuel System

Figure 2A:
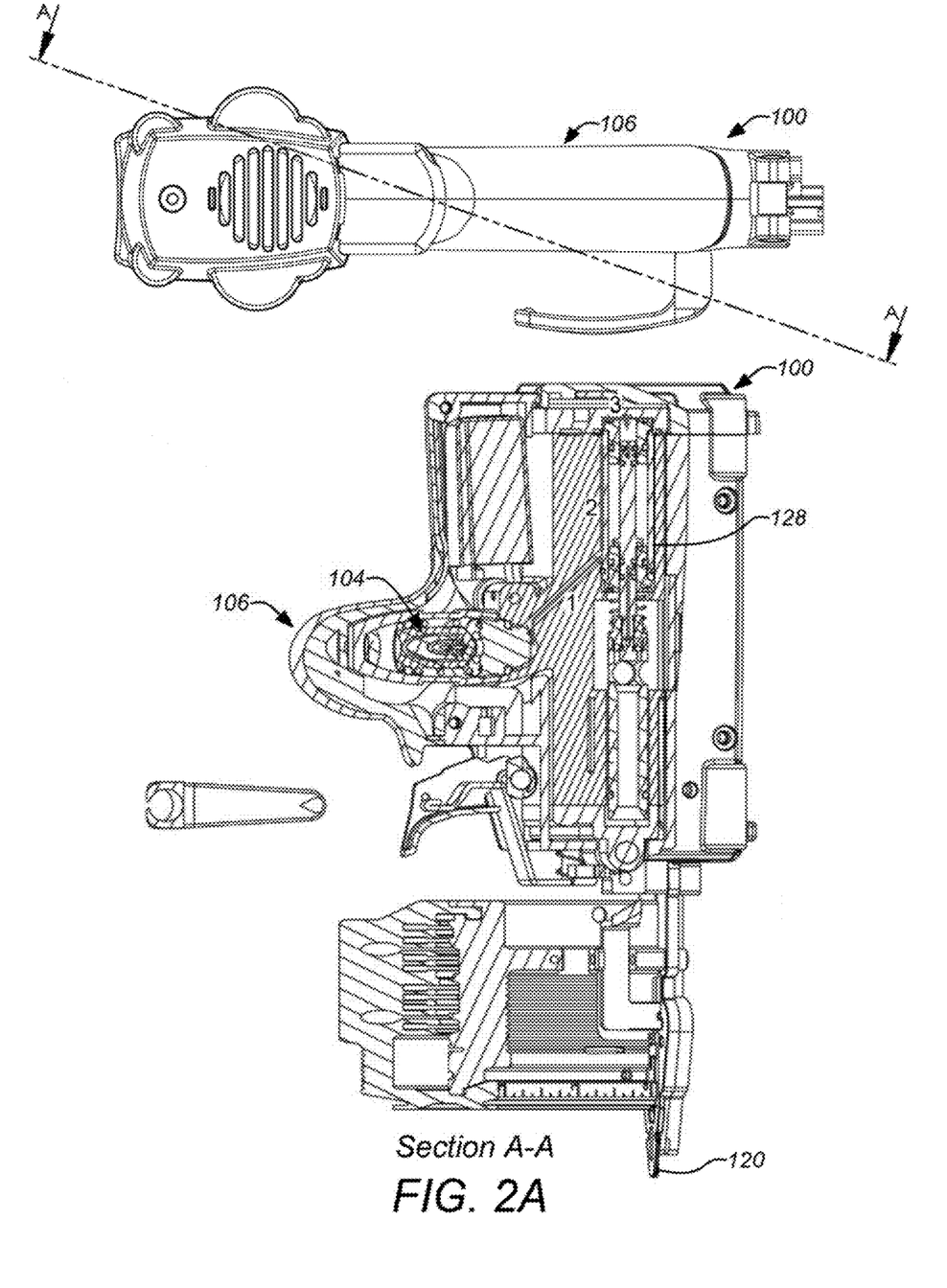
FIG. 2A shows the fuel flowpath from the pressure regulator in the handle to the fuel pump.

FIG. 2A shows the fuel flowpath from the pressure regulator 104 in the handle 106 to the fuel pump 128. The fuel pump 128 is cylindrical in the cylindrical section of the housing parallel to the piston and driver cylindrical section and the valve system cylindrical section. See e.g. FIG. 1A. A passage in the housing allows fuel to pass from the pressure regulator 104 in the handle 106 to the inlet end of the fuel pump 128 near the top of the housing. Fuel output from the pressure regulator flows through a small hole along path 1 to the bore that houses the fuel pump 128. The fuel then continues along path 2 in a space between the bore and the fuel pump 128. The fuel then continues along path 3 in a space between the top cap (enclosing the bore) and the fuel pump 128 to reach the entrance of the fuel pump 128 at one end.

As previously mentioned, the fuel pump is activated by movement of the safety 120 at the nose of the tool 100 when it is pressed against a surface. The linear motion of the safety 120 is in line with the motion required to activate the fuel pump 128 therefore maximizing the efficiency of movement while minimizing the chances of jamming.

Figure 2B:
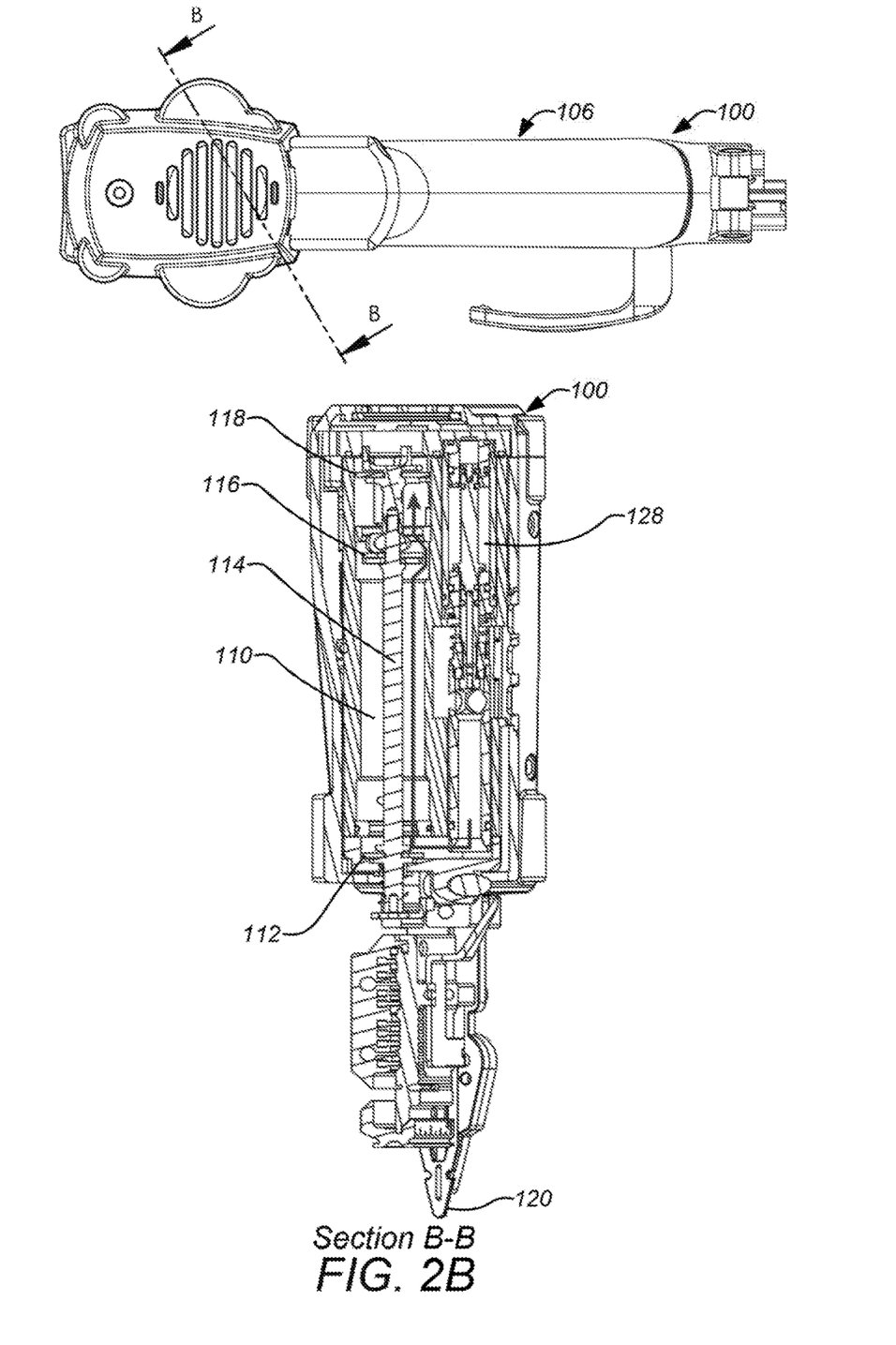
FIG. 2B shows the fuel flowpath from the fuel pump to the combustion chamber.

FIG. 2B shows the fuel flowpath from the fuel pump 128 to the combustion chamber. The outlet of the fuel pump 128 at the bottom end flows through a passage in the housing to the inlet valve 112 as shown.

Figure 3:
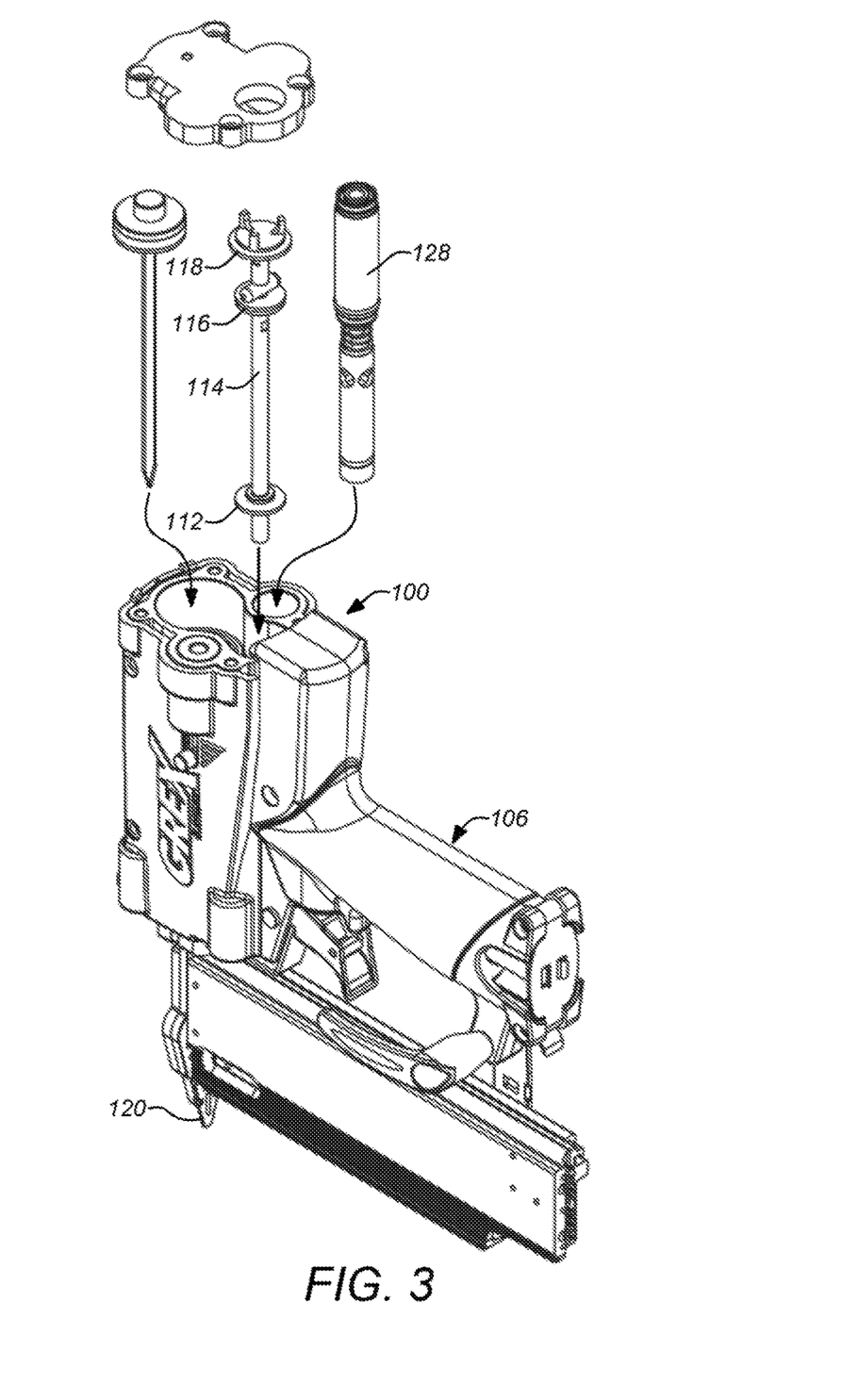
FIG. 3 shows an exploded view of the tool including the piston driver, the combustion chamber valve system, and the fuel pump for an example embodiment of the invention.
Figure 4A:
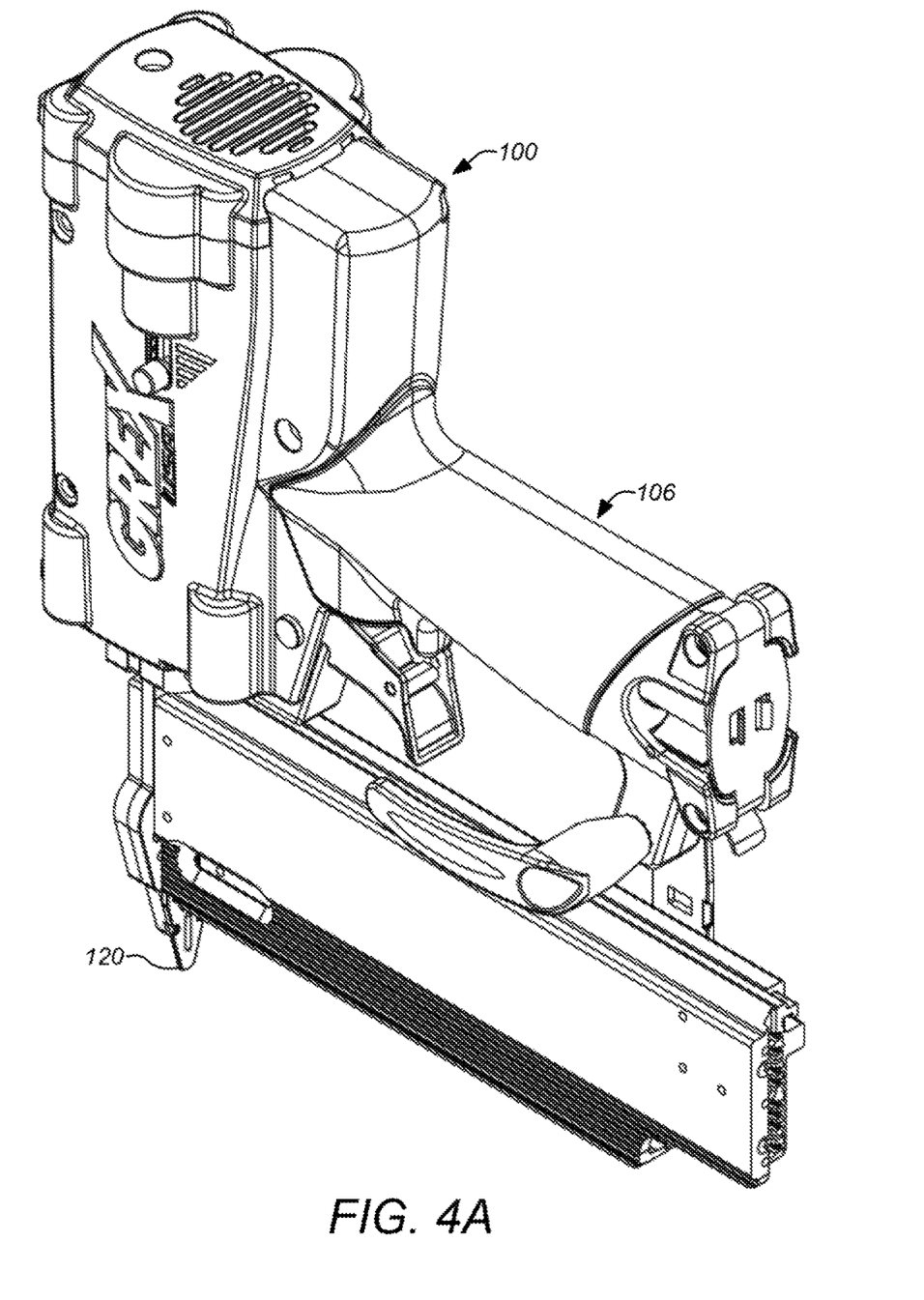
FIGS. 4A and 4B show different views of an example embodiment of the invention.
Figure 4B:
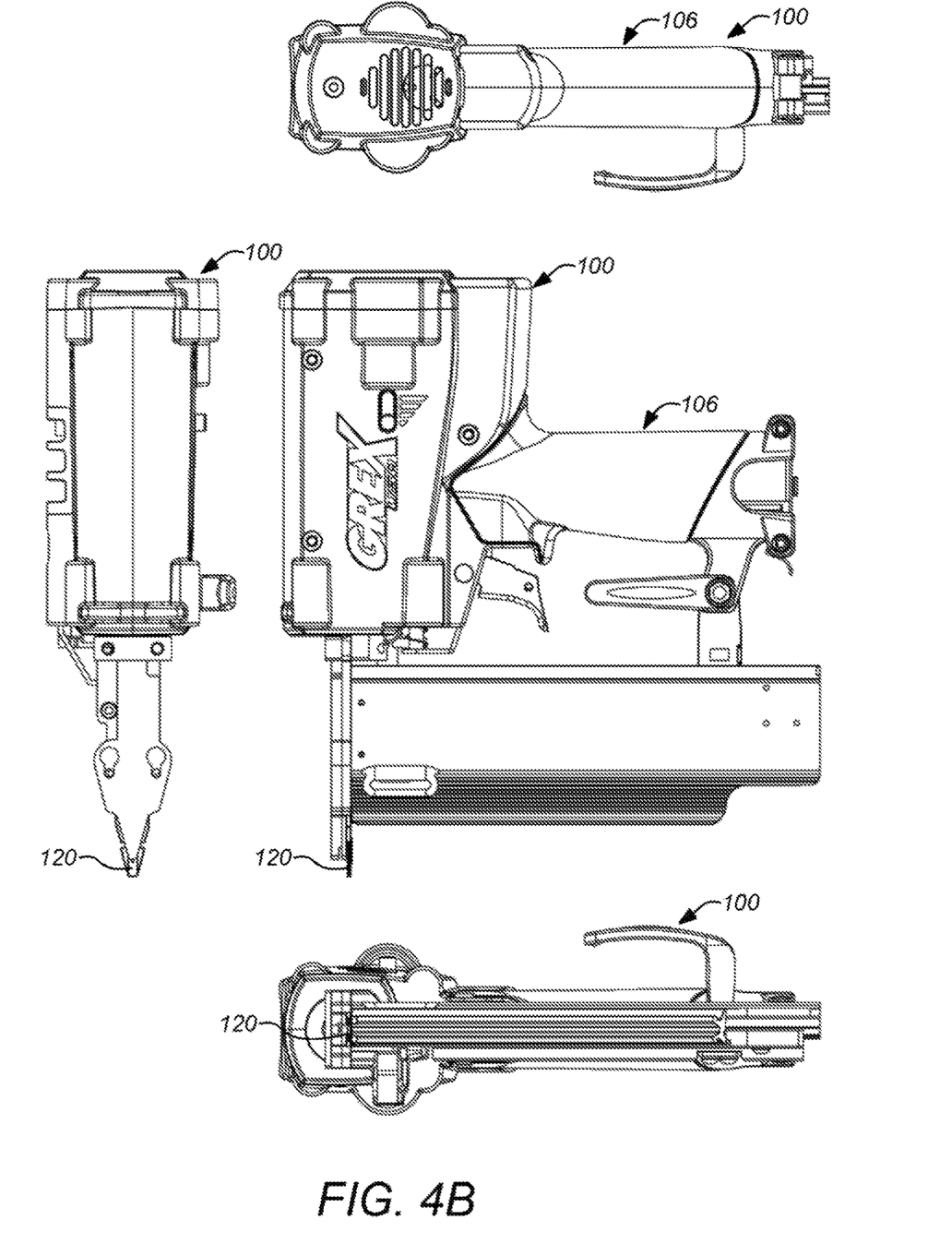

FIG. 3 shows an exploded view of the tool including the piston driver 130, the combustion chamber valve system, and the fuel pump 128 for an example embodiment of the invention and FIGS. 4A and 4B show different views of an example embodiment of the invention. The parallel cylindrical sections for the the piston driver 130, the combustion chamber valve system, and the fuel pump 128 are clearly shown.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus, comprising:
    a combustion chamber;
    a central shaft having an inlet valve for an inlet from a fuel pump, a control valve for a separating two portions of the combustion chamber, and a charging exhaust valve for allowing excess fuel and air to exhaust during charging disposed within the combustion chamber, the inlet valve, the control valve, and the charging exhaust valve are disposed in a closed position together by movement of the central shaft substantially away from a delivery point of the tool and parallel to movement of a piston and driver; and
    a trigger activated by motion away from the delivery point of the tool moves a link in contact with the central shaft Yaw from the delivery point causing the movement of the central shaft away from the delivery point and subsequent firing of the combustion chamber;
    wherein the combustion chamber comprises a pair of parallel cylindrical sections with one of the pair of cylindrical sections having a piston and driver disposed therein for driving a fastener at the delivery point proximate a first end of the cylindrical section, another of the pair of parallel cylindrical sections having the central shaft, inlet valve, control valve and charging exhaust valve disposed therein, and the pair of parallel cylindrical sections are coupled proximate a second end distal the delivery point; and
    wherein the inlet valve comprises a wedged circumferential edge seal in the closed position.

2. The apparatus of claim 1, wherein the control valve comprises an edge circumferential seal with a ventilated support in the closed position.

3. The apparatus of claim 1, wherein the charging exhaust valve comprises a face seal in the closed position.

4. The apparatus of claim 1, wherein at least one of the inlet valve, the control valve, and the charging exhaust valve, comprises an elastomeric material.

5. The apparatus of claim 1, wherein the charging of the combustion chamber is activated by a safety proximate the delivery point pressed against a workpiece surface such that movement of the safety away from the delivery point activates a fuel pump by movement substantially away from the delivery point to cause fuel and air to be delivered through the inlet valve.

6. The apparatus of claim 5, wherein the fuel pump is disposed parallel to the combustion chamber.

7. The apparatus of claim 1, wherein the charging of the combustion chamber is activated by a safety proximate the delivery point pressed against a workpiece surface such that movement of the safety away from the delivery point activates a fuel pump by movement substantially away from the delivery point to cause fuel and air to be delivered through the inlet valve.

8. The apparatus of claim 7, wherein the fuel pump is disposed parallel to the pair of parallel cylindrical sections of the combustion chamber.

9. An apparatus, comprising:
    a combustion chamber comprising a pair of parallel cylindrical sections with one of the pair of cylindrical sections having a piston and driver disposed therein for driving a fastener at the delivery point proximate a first end of the cylindrical section and the pair of parallel cylindrical sections are coupled proximate a second end distal the delivery point; and
    a fuel pump disposed in a third cylindrical section parallel and adjacent to the parallel cylindrical sections of the combustion chamber;
    a central shaft having an inlet valve for an inlet from the fuel pump, a control valve for separating two portions of the combustion chamber, and a charging exhaust valve for allowing excess fuel and air to exhaust during charging disposed within the combustion chamber, the inlet valve, the control valve, and the charging exhaust valve are disposed in a closed position together by movement of the central shaft substantially away from a delivery point of the tool and parallel to movement of a piston and driver;

wherein the central shaft, inlet valve, control valve and charging exhaust valve are all disposed within an other of the pair of cylindrical sections of the combustion chamber;

wherein charging of the combustion chamber is activated by a safety proximate the delivery point pressed against a workpiece surface such that movement of the safety away from the delivery point activates a fuel pump by movement substantially away from the delivery point to cause fuel and air to be delivered through the inlet valve; and wherein the inlet valve comprises a wedged circumferential edge seal in the closed position.

10. The apparatus of claim 9, further comprising a trigger activated by motion away from the delivery point of the tool and thereby causing the movement of the central shaft and subsequent firing the combustion chamber.

11. The apparatus of claim 9, wherein the control valve comprises an edge circumferential seal with a ventilated support in the closed position.

12. The apparatus of claim 9, wherein the charging exhaust valve comprises a face seal in the closed position.

13. The apparatus of claim 9, wherein at least one of the inlet valve, the control valve, and the charging exhaust valve, comprises an elastomeric material.

* * * * *